(12) United States Patent
Balliu et al.

(10) Patent No.: US 11,921,832 B2
(45) Date of Patent: Mar. 5, 2024

(54) AUTHENTICATION BY A FACIAL BIOMETRIC

(71) Applicant: Capital One Services, LLC, McLean, VA (US)

(72) Inventors: Arnold Balliu, Potomac, MD (US); Kelly Jo Brown, Rockville, MD (US); Jocelyn Huang, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 579 days.

(21) Appl. No.: 17/247,975

(22) Filed: Jan. 4, 2021

(65) Prior Publication Data

US 2022/0215079 A1 Jul. 7, 2022

(51) Int. Cl.
*G06F 21/00* (2013.01)
*G06F 21/32* (2013.01)
*G06T 7/50* (2017.01)

(52) U.S. Cl.
CPC ............. *G06F 21/32* (2013.01); *G06T 7/50* (2017.01); *G06T 2207/10028* (2013.01); *G06T 2207/10048* (2013.01)

(58) Field of Classification Search
CPC . G06F 21/32; G06T 7/50; G06T 2207/10028; G06T 2207/10048
See application file for complete search history.

(56) References Cited

U.S. PATENT DOCUMENTS

| 10,678,898 | B2 | 6/2020 | Hoyos et al. | |
| 2016/0379211 | A1 | 12/2016 | Hoyos et al. | |
| 2017/0243213 | A1* | 8/2017 | Castinado | H04W 12/06 |
| 2019/0213309 | A1* | 7/2019 | Morestin | G01S 17/04 |
| 2022/0207915 | A1* | 6/2022 | Voss | G07C 9/257 |

* cited by examiner

*Primary Examiner* — Jeffrey C Pwu
*Assistant Examiner* — William A Corum, Jr.
(74) *Attorney, Agent, or Firm* — Harrity & Harrity, LLP (57) ABSTRACT

In some implementations, a terminal device may receive, from a mobile device associated with a user, first information identifying a first facial depth map of the user generated by the mobile device. The terminal device may generate a second facial depth map of the user. The first facial depth map may be generated before the second facial depth map. The terminal device may determine whether the user is authenticated to perform an exchange based on whether the first information identifying the first facial depth map corresponds to second information identifying the second facial depth map. The terminal device may transmit, to the mobile device and based on determining that the user is authenticated, a message indicating that the user is authenticated. The terminal device may receive, from the mobile device, exchange information identifying a credential for performing the exchange.

18 Claims, 8 Drawing Sheets

AUTHENTICATION BY A FACIAL BIOMETRIC

BACKGROUND

Biometric authentication is used as a form of identification and access control. Biometric identifiers are the distinctive, measurable characteristics used to label and describe individuals. Biometric identifiers are often categorized as physiological characteristics versus behavioral characteristics. Physiological characteristics are related to the shape of the body. Behavioral characteristics are related to the pattern of behavior of a person, including but not limited to typing rhythm, gait, and voice.

SUMMARY

In some implementations, a system for authentication of a user includes one or more memories, and one or more processors communicatively coupled to the one or more memories, configured to: establish a connection with a mobile device associated with the user; receive, from the mobile device, first information identifying a first facial depth map of the user generated by the mobile device prior to establishing the connection; obtain second information identifying a second facial depth map of the user generated by the system after establishing the connection; determine whether the user is authenticated to perform an exchange based on whether the first information identifying the first facial depth map corresponds to the second information identifying the second facial depth map; transmit, to the mobile device via the connection and based on determining that the user is authenticated, a message indicating that the user is authenticated; and receive, from the mobile device via the connection, exchange information identifying a credential for performing the exchange.

In some implementations, a non-transitory computer-readable medium storing a set of instructions for authentication of a user includes one or more instructions that, when executed by one or more processors of a terminal device, cause the terminal device to: receive, from a mobile device associated with the user, first information identifying a first facial depth map of the user generated by the mobile device; generate a second facial depth map of the user, where the first facial depth map is generated before the second facial depth map; determine whether the user is authenticated to perform an exchange based on whether the first information identifying the first facial depth map corresponds to second information identifying the second facial depth map; transmit, to the mobile device and based on determining that the user is authenticated, a message indicating that the user is authenticated; and receive, from the mobile device, exchange information identifying a credential for performing the exchange.

In some implementations, a method for authenticating a user includes establishing, by a terminal device, a connection with a mobile device associated with the user; obtaining, by the terminal device, first facial biometric information of the user generated by the mobile device prior to establishing the connection; obtaining, by the terminal device, second facial biometric information of the user generated by the terminal device after establishing the connection; determining, by the terminal device, whether the user is authenticated to perform an exchange based on whether the first facial biometric information corresponds to the second facial biometric information; transmitting, by the terminal device to the mobile device via the connection and based on determining that the user is authenticated, a message indicating that the user is authenticated; and receiving, by the terminal device from the mobile device via the connection, exchange information identifying a credential for performing the exchange.

DETAILED DESCRIPTION

The following detailed description of example implementations refers to the accompanying drawings. The same reference numbers in different drawings may identify the same or similar elements.

Transaction terminals, such as point of sale (POS) devices, include hardware and software components that facilitate completion of retail transactions for goods and services. For example, a user may perform a transaction by swiping, inserting, or tapping a transaction card at the transaction terminal. In many instances, a transaction card may be lost or stolen, resulting in the transaction card being in the possession of an unauthorized user. Accordingly, the unauthorized user may fraudulently enter into transactions using the lost or stolen transaction card, enabling the unauthorized user to fraudulently pay for goods or services, among other examples.

To combat such fraudulent use, the transaction terminal may request that a user enter a personal identification number (PIN) or a signature at the transaction terminal to authenticate the transaction. However, the PIN may be obtained by the unauthorized user and/or the signature may be forged by the unauthorized user. Accordingly, it is difficult to prevent the use of a transaction card by an unauthorized user that is in possession of the transaction card. Moreover, in order to enter a PIN or a signature at a transaction terminal, a user must touch the transaction terminal or be in close proximity to a clerk operating the transaction terminal, thereby proliferating the spread of infectious diseases (e.g., viruses).

In some implementations, to solve the problems described above, as well as a related technical problem of how to use a facial biometric for authentication of a user at a transaction terminal, a technical solution is described herein for authenticating a user to conduct a transaction at a transaction terminal using a facial biometric. In some examples, the facial biometric is a facial depth map generated using an infrared (IR) and/or color (e.g., visible spectrum) camera. For example, the user may use a mobile device to generate a reference facial biometric of the user using a camera of the mobile device. The reference facial biometric may be generated before a time of the transaction, such as days, weeks, months, or even years in advance, and stored on the mobile device. Subsequently, the transaction may be automatically commenced when the mobile device is moved to within a threshold proximity of the transaction terminal, thereby initiating a short-range wireless communication connection procedure between the mobile device and the transaction terminal. The mobile device may transmit, via the connection, the reference facial biometric. Additionally, the transaction terminal may generate (e.g., at a time of the transaction) a facial biometric of the user using a camera of the transaction terminal (or a nearby camera in communication with the transaction terminal). For example, the transaction terminal may perform a distance sensing operation in connection with the user and generate a facial depth map based on the distance sensing operation. The transaction terminal may determine whether the user is authenticated by determining whether the reference facial biometric corresponds to the facial biometric generated at the time of the transaction, such as by using machine learning to identify similarities between the facial biometrics. Based on the user being authenticated, the mobile device may transmit a credential via the connection for use in the transaction.

In this way, the mobile device and the transaction terminal perform an efficient procedure for authentication of the user and performance of the transaction. In particular, the user may be authenticated, and the transaction performed, without the user needing to take out or operate the mobile device. This enables speedy completion of the transaction without processing delays, thereby conserving computing resources of the transaction terminal and maximizing a transaction throughput of the transaction terminal. Moreover, the use of a facial biometric to authenticate the user, and the use of a credential transmitted by the mobile device to perform the transaction, may prevent fraudulent transactions. Therefore, any computing resources (e.g., processing resources, memory resources, and/or power resources) and/or network resources involved in correcting any fraudulent activity that would have been otherwise allowed may be conserved.

Moreover, the techniques and devices described herein enable customer interaction with the transaction terminal to be reduced. For example, it may not be necessary for a customer to touch the transaction terminal in order to complete a transaction. Accordingly, transactions can be completed in a contactless manner, which may provide an improved experience and reduce the spread of infectious diseases.

FIGS. 1A-1E are diagrams of an example 100 associated with authentication by a facial biometric. As shown in FIGS. 1A-1E, example 100 includes a mobile device, a transaction terminal (e.g., a terminal device), and a transaction backend system. These devices are described in more detail in connection with FIGS. 2 and 3. In some examples, the transaction terminal may be associated with an entity, such as a merchant, and the mobile device may be associated with a user, such as a customer, of the entity. The transaction terminal may facilitate a transaction (which may be used interchangeably with "exchange" herein) between the entity and the user.

Figure 1A:
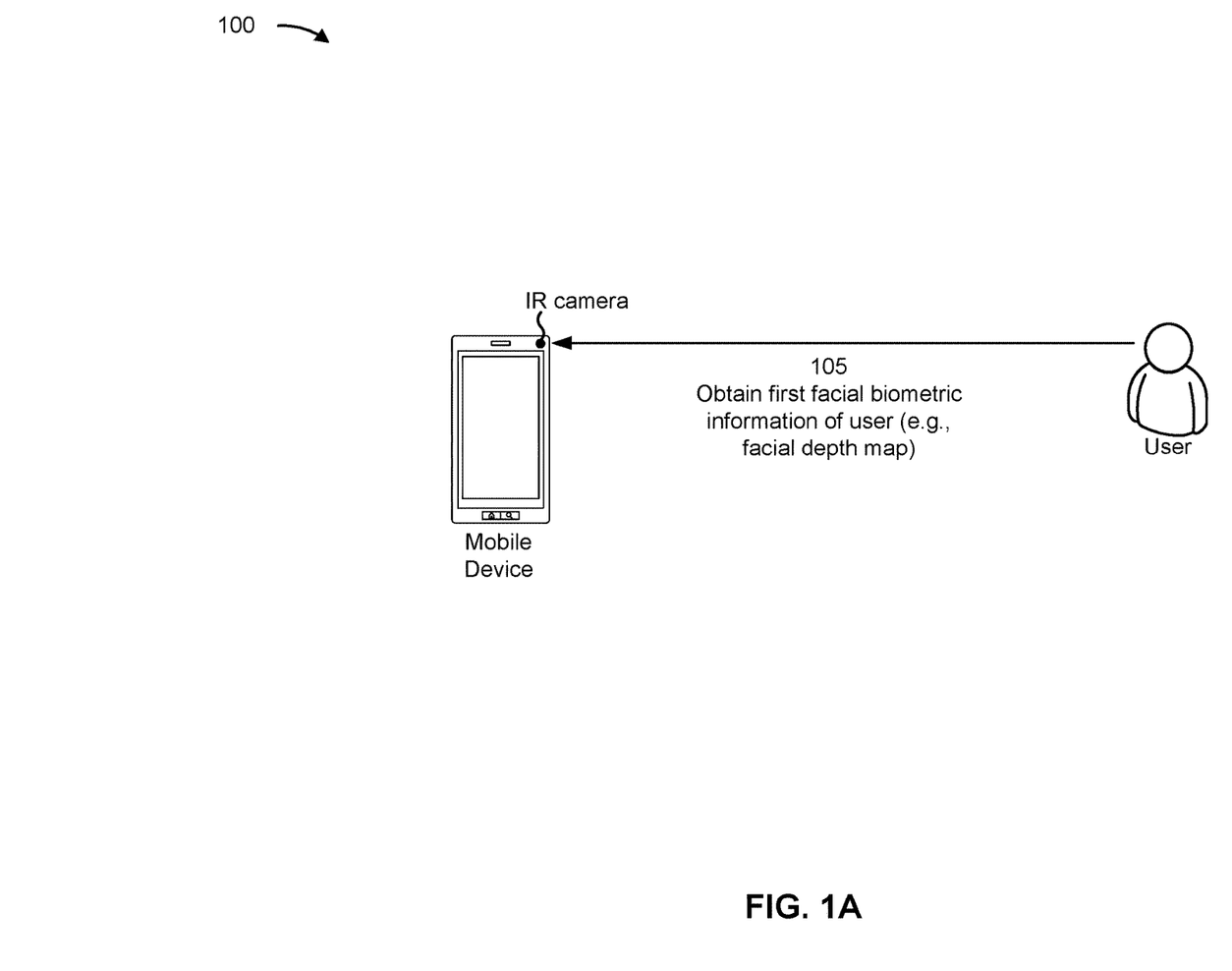
FIGS. 1A-1E are diagrams of an example implementation relating to authentication by a facial biometric.

As shown in FIG. 1A and by reference number 105, the mobile device may obtain first facial biometric information (e.g., reference facial biometric information) in connection with the user. That is, the mobile device may obtain first information identifying a first facial biometric of the user. The facial biometric may be one or more features of the user's face and/or a facial depth map of the user. A facial depth map may provide a three-dimensional (3D) representation of the user's face or a portion of the user's face, and therefore is unique to the user, can be obtained in poor lighting conditions, and is difficult to spoof.

The mobile device (e.g., using an application executing on the mobile device) may obtain the first facial biometric information using a camera of the mobile device. For example, the mobile device may capture an image of the user's face, and the mobile device may process the image (e.g., using a facial recognition technique) to generate a facial biometric and obtain the first facial biometric information (e.g., identifying one or more features of the user's face). The mobile device may capture the image using a camera of the mobile device. In some implementations, the mobile device may transmit the image to a remote device and receive the first facial biometric information from the remote device (e.g., based on processing of the image performed by the remote device).

As another example, the mobile device may perform a depth scan of the user's face, and the mobile device may process the results of the depth scan to generate a facial biometric and obtain the first facial biometric information (e.g., identifying the facial depth map of the user). The mobile device may perform the depth scan using an IR camera (or thermal camera) of the mobile device and/or a color camera of the mobile device. In some examples, performing the depth scan may include performing a distance sensing (e.g., a range sensing) operation (e.g., using an IR camera) in connection with the user, and the mobile device may generate a facial depth map of the user based on the distance sensing operation. For example, the mobile device may perform a time of flight (ToF) operation (e.g., using an IR emitter and an IR sensor of the IR camera) to obtain the first facial biometric information. In some implementations, the mobile device may transmit the results of the depth scan to a remote device and receive the first facial biometric information from the remote device (e.g., based on processing of the depth scan results performed by the remote device).

The mobile device may obtain the first facial biometric information (e.g., generate the first facial biometric) prior to a procedure for performing a transaction at the transaction terminal. For example, the procedure for performing the transaction at the transaction terminal may begin by establishing a communication connection between the mobile device and the transaction terminal, as described below. Accordingly, the mobile device may obtain the first facial biometric information prior to establishing the connection with the transaction terminal. In some examples, the mobile device may obtain the first facial biometric information one or more days, weeks, months, or years prior to performing the transaction at the transaction terminal. For example, the mobile device may obtain the first facial biometric information during an initial setup procedure of the mobile device, during a registration procedure for an application installed on the mobile device, and/or during a registration procedure for a transaction card, an account, and/or a credential that is usable via the mobile device.

The mobile device may store the first facial biometric information (e.g., in a memory of the mobile device). In some implementations, the mobile device may transmit the first facial biometric information to the transaction backend system (e.g., in connection with a registration procedure for a transaction card, an account, and/or a credential), and the transaction backend system may store the first facial biometric information. For example, the transaction backend system may determine a hash value of the first facial biometric information, and the transaction backend system may store the hash value instead of the first facial biometric information.

Figure 1B:
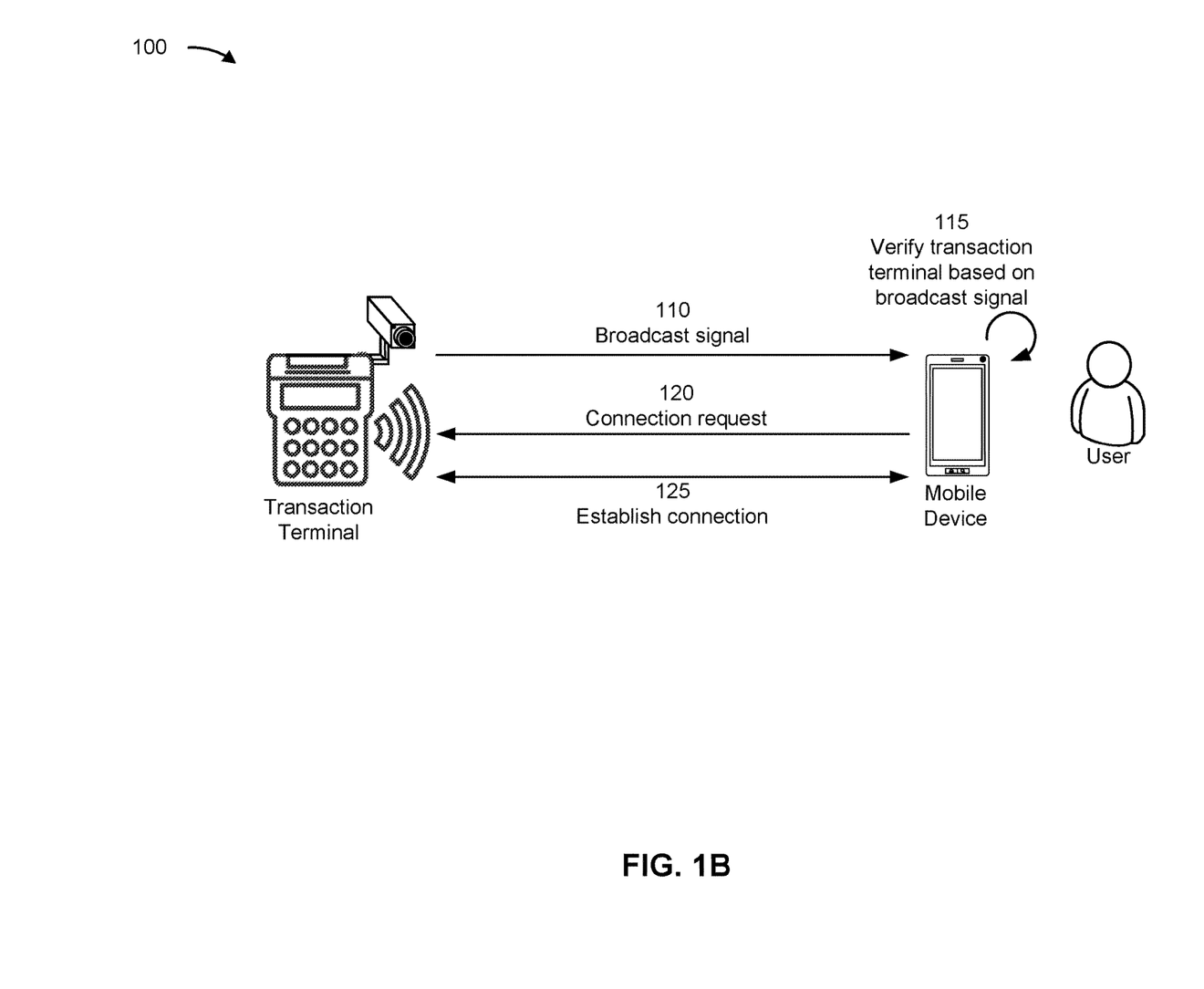

As shown in FIG. 1B and by reference number 110, the transaction terminal may broadcast a signal. The signal may identify the transaction terminal (e.g., the signal may include an identifier of the transaction terminal). The signal may be a Bluetooth low energy (BLE) signal or another signal associated with short-range wireless communication (e.g., near field communication (NFC)). The transaction terminal may include a beacon (e.g., a BLE beacon) that is used to broadcast the signal. In some implementations, the transaction terminal may change the signal that is broadcast at regular intervals or irregular intervals for added security.

As shown by reference number 115, the mobile device (e.g., using an application executing on the mobile device) may verify the transaction terminal based on the signal. The mobile device may detect (e.g., receive) the signal when the mobile device is within a threshold distance of the transaction terminal. The mobile device may verify the transaction terminal based on a determination that information identified in the signal can be decrypted using a digital key on the mobile device. Additionally, or alternatively, the mobile device may verify the transaction terminal based on a determination that the signal is received on one or more particular (e.g., signature) broadcast channels.

As shown by reference number 120, the mobile device may transmit a connection request to the transaction terminal. That is, based on verifying the transaction terminal, the mobile device may initiate a connection procedure (e.g., pairing) with the transaction terminal, and the request may indicate that the transaction terminal is approved to pair with the mobile device. Based on receiving the request, the transaction terminal may also initiate a connection procedure (e.g., pairing) with the mobile device. Accordingly, the transaction terminal and the mobile device may establish a connection, as shown by reference number 125. The connection may be a secure connection (e.g., information exchanged via the connection may be encrypted). The connection may be a short-range wireless communication connection (e.g., a BLE connection or an NFC connection, among other examples). Accordingly, the connection may be broken when the mobile device is outside of the threshold distance of the transaction terminal (e.g., if the user walks away from the transaction terminal). A loss of the connection may trigger the transaction terminal and/or the mobile device to delete data associated with the connection, delete data exchanged via the connection, and/or cancel a transaction being performed via the connection, among other examples.

Figure 1C:
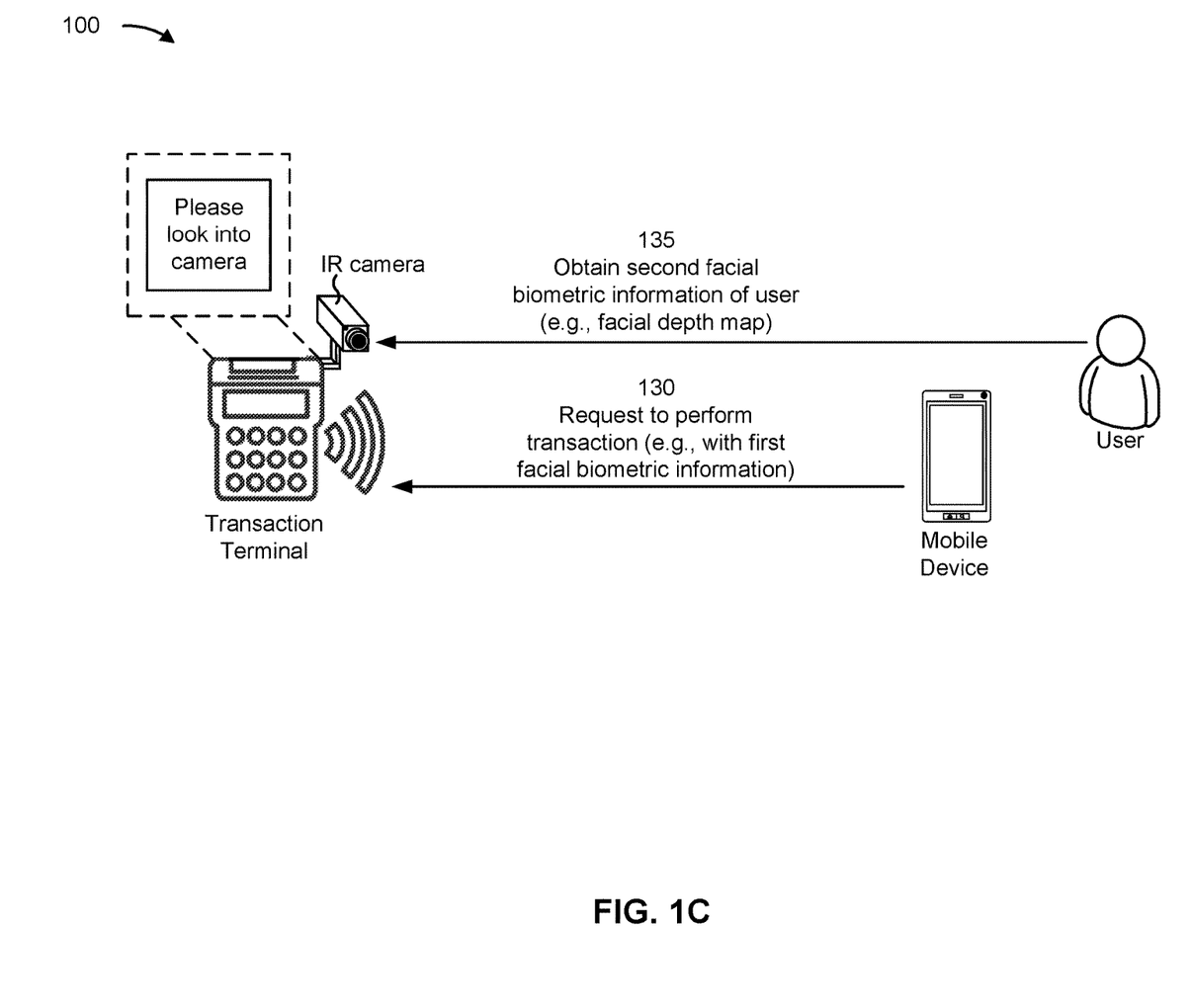

As shown in FIG. 1C and by reference number 130, the mobile device (e.g., using an application executing on the mobile device) may transmit to the transaction terminal, via the connection, a request to perform a transaction at the transaction terminal. The request may indicate that the user of the mobile device is to be authenticated using a facial biometric prior to performing the transaction. In some implementations, the request may include the first facial biometric information stored at the mobile device. In some implementations, the mobile device may transmit a subsequent message, via the connection, that includes the first facial biometric information. For example, the mobile device may transmit the subsequent message after receiving a message from the transaction terminal indicating that the mobile device's request is accepted and/or that the transaction terminal is ready for the transaction to be performed. In some implementations, the mobile device may not transmit the first facial biometric information to the transaction terminal. For example, the transaction terminal may obtain the first facial biometric information from the transaction backend system. As another example, authentication using facial biometric information may be performed at the mobile device rather than at the transaction terminal, as described below.

As shown by reference number 135, the transaction terminal may obtain second facial biometric information of the user. That is, the transaction terminal may obtain second information identifying a second facial biometric of the user. The first facial biometric and the second facial biometric may relate to the same set of facial features and/or the first facial biometric and the second facial biometric may both be facial depth maps.

The transaction terminal (e.g., based on pairing with the mobile device and/or receiving the request from the user) may display a prompt indicating that the user is to look into a camera or otherwise direct the user's gaze in a particular direction. The camera may be included in the transaction terminal, located at the transaction terminal, or located remotely from the transaction terminal (e.g., mounted to a ceiling or a wall). The camera and the transaction terminal may be connected (e.g., wirelessly or by wires) to allow data to be exchanged between the camera and the transaction terminal. The camera may be an IR and/or color camera, as described above. In some implementations, the camera may include multiple cameras (e.g., for IR and color).

The camera may be located such that the camera is well-positioned to capture the face of the user as the user is arriving at the transaction terminal or standing at the transaction terminal. For example, the camera may be positioned to capture the face of the user when the user is looking at a display of the transaction terminal. In some implementations, the transaction terminal, or another device, may determine a location of the user's face (e.g., using a machine learning model and/or a computer vision technique) and may cause the camera to pivot (e.g., pan) and/or may adjust one or more settings of the camera (e.g., a zoom setting or a focal length setting, among other examples) so that the user's face is optimally oriented in a field of view of the camera. In this way, the second facial biometric information is likely to be obtained in a first attempt, thereby reducing delays associated with multiple attempts to properly obtain the second facial biometric information.

The transaction terminal may obtain the second facial biometric information using the camera, in a similar manner as described above. For example, the transaction terminal may capture an image of the user's face, and the transaction terminal may process (or cause another device to process) the image to generate the second facial biometric and obtain the second facial biometric information in a similar manner as described above. As another example, the transaction terminal may perform a depth scan of the user's face (e.g., a distance sensing operation and/or a ToF operation), and the transaction terminal may process (or cause another device to process) the results of the depth scan to generate the second facial biometric and obtain the second facial biometric information, in a similar manner as described above.

In some examples, multiple people may be in a field of view of the camera when the transaction terminal is obtaining the second facial biometric information of the user (e.g., multiple customers may be in a queue at the transaction terminal). Here, the transaction terminal may identify the user, among the multiple people, in order to obtain the second facial biometric information of the user. For example, the transaction terminal may identify the user based on a determination that the user is closest to the transaction terminal and/or the camera. As an example, the transaction terminal may identify a nearest person in connection with a depth scan performed by the transaction terminal, and the transaction terminal may identify the user as the nearest person.

The transaction terminal may obtain the second facial biometric information (e.g., generate the second facial biometric) as part of the procedure for performing the exchange. For example, the transaction terminal may obtain the second facial biometric information after establishing the connection with the mobile device (and before terminating the connection with the mobile device). In other words, the first facial biometric is generated before the second facial biometric is generated. The transaction terminal may store the second facial biometric information (e.g., in a memory of the transaction terminal).

Figure 1D:
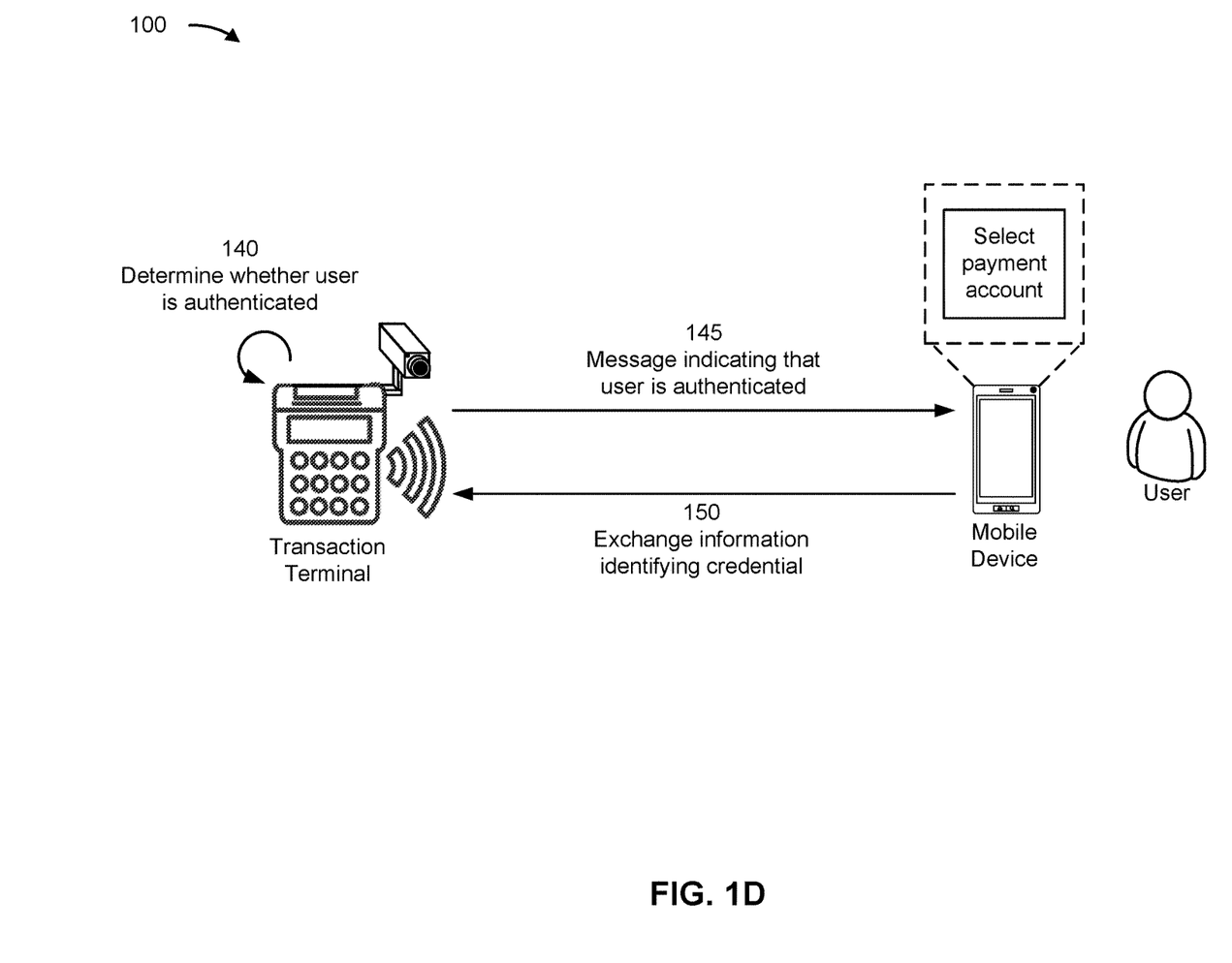

As shown in FIG. 1D and by reference number 140, the transaction terminal may determine whether the user is authenticated to perform the transaction. The transaction terminal may determine whether the user is authenticated based on whether the first facial biometric information corresponds to the second facial biometric information. In some implementations, the transaction terminal may determine whether the first facial biometric information (e.g., first information identifying a first facial depth map of the user) corresponds to the second facial biometric information (e.g., second information identifying a second facial depth map of the user). That is, the transaction terminal may compare the first facial biometric information and the second facial biometric information. In some implementations, the transaction terminal may transmit the first facial biometric information and the second facial biometric information to a remote device (e.g., for comparison), and receive an indication of whether the first facial biometric information corresponds to the second facial biometric information from the remote device (e.g., based on a determination made at the remote device). In some implementations, the transaction terminal may determine a hash value of the second facial biometric information, and the transaction terminal may compare a hash value of the first facial biometric information (e.g., obtained from the transaction backend system) and the hash value of the second facial biometric information in order to determine whether the first facial biometric information and the second facial biometric information correspond.

In some examples, the first facial biometric information may be the same as the second facial biometric information, and accordingly, the transaction terminal may determine that the first facial biometric information and the second facial biometric information correspond. In some other examples, the first facial biometric information may be different from the second facial biometric information, for example, due to the user's face being angled differently relative to a camera, due to the user aging, due the user switching between wearing and not wearing glasses, among other examples, when the first facial biometric information and the second facial biometric information are obtained. Here, the transaction terminal may determine (e.g., using one or more machine learning models) that the first facial biometric information corresponds to the second facial biometric information based on a determination that a degree of similarity between the first facial biometric information (e.g., the first facial biometric represented by the first facial biometric information) and the second facial biometric information (e.g., the second facial biometric represented by the second facial biometric information) satisfies a threshold value.

In some implementations, the transaction terminal may determine whether the user is authenticated based on a recency of the first facial biometric. In this case, the first facial biometric information may also identify a time when the first facial biometric was generated (e.g., when an image capture and/or depth scan was performed in connection with generating the first facial biometric). The transaction terminal may determine whether the time is before a subsequent time, when the second facial biometric was generated, by a threshold amount (e.g., 1 day or 1 week). The transaction terminal may determine that the user is authenticated based on determining that the time is before the subsequent time by the threshold amount. Accordingly, transaction terminal may not authenticate the user if the first facial biometric and the second facial biometric are generated too close in time, which may indicate that an unauthorized user is in possession of the user's mobile device.

In some examples, the transaction terminal may determine that the user is not authenticated. For example, the transaction terminal may determine that the user is not authenticated if the first facial biometric information and the second facial biometric information do not correspond (e.g., if the first facial biometric information and the second facial biometric information do not meet a threshold degree of similarity) and/or if the first facial biometric and the second facial biometric are generated too close in time, as described above.

In some implementations, the determination of whether the user is authenticated is made at the mobile device rather than at the transaction terminal. For example, the transaction terminal may transmit to the mobile device, via the connection, the second facial biometric information (and the mobile device may not transmit the first facial biometric information to the transaction terminal). Accordingly, the mobile device may determine whether the user is authenticated based on whether the first facial biometric information corresponds to the second facial biometric information, in a similar manner as described above. For example, the mobile device may determine whether the first facial biometric information corresponds to the second facial biometric information and/or transmit the first facial biometric information and the second facial biometric information to a remote device to make such a determination, in a similar manner as described above.

In some implementations, the determination of whether the user is authenticated is made at another device, such as the transaction backend system. For example, the mobile device may transmit the first facial biometric information to the other device, and the transaction terminal may transmit the second facial biometric information to the other device. As another example, one of the transaction terminal or the mobile device may transmit both the first facial biometric information and the second facial biometric information to the other device.

As shown in FIG. 1D and by reference number 145, the transaction terminal may transmit to the mobile device, via the connection, a message indicating that the user is authenticated based on determining that the user is authenticated (e.g., the first facial biometric information and the second facial biometric information correspond). The message may cause the mobile device to prompt the user to select a credential (e.g., from a digital wallet) for performing the exchange. Alternatively, if the mobile device determines that the user is authenticated, the mobile device may prompt the user to select a credential for performing the exchange (e.g., without receiving the message from the transaction terminal).

In some implementations, the transaction terminal may transmit to the mobile device a different message indicating that the user is not authenticated based on determining that the user is not authenticated (or the mobile device may determine that the user is not authenticated). In this case, the transaction terminal may delete the first facial biometric information (if provided) and/or the second facial biometric information from storage, may again display a prompt indicating that the user is to look into a camera (e.g., to again attempt to authenticate the user), may terminate the connection with the mobile device, and/or may transmit an indication to the transaction backend system that the mobile device is associated with use indicative of fraud (e.g., based on a determination that a degree of similarity between the first facial biometric information and the second facial biometric information is below a threshold value), among other examples. Moreover, based on receiving the message that the user is not authenticated, the mobile device may delete the second facial biometric information (if provided) from storage, may terminate the connection with the transaction terminal, may disable one or more operations of the mobile device (e.g., one or more operations that enable the mobile device to perform transactions), and/or may disable one or more credentials (e.g., used to perform transactions) stored on the mobile device, among other examples.

As shown by reference number 150, the mobile device (e.g., using an application executing on the mobile device) may transmit to the transaction terminal, via the connection, exchange information identifying a credential for performing the transaction. That is, the mobile device may transmit the exchange information identifying the credential based on receiving the message indicating that the user is authenticated and/or based on determining that the user is authenticated. The credential may identify payment information for the transaction. For example, the credential may be associated with a transaction card of the user or another account of the user. As an example, the credential may identify an account number.

Figure 1E:
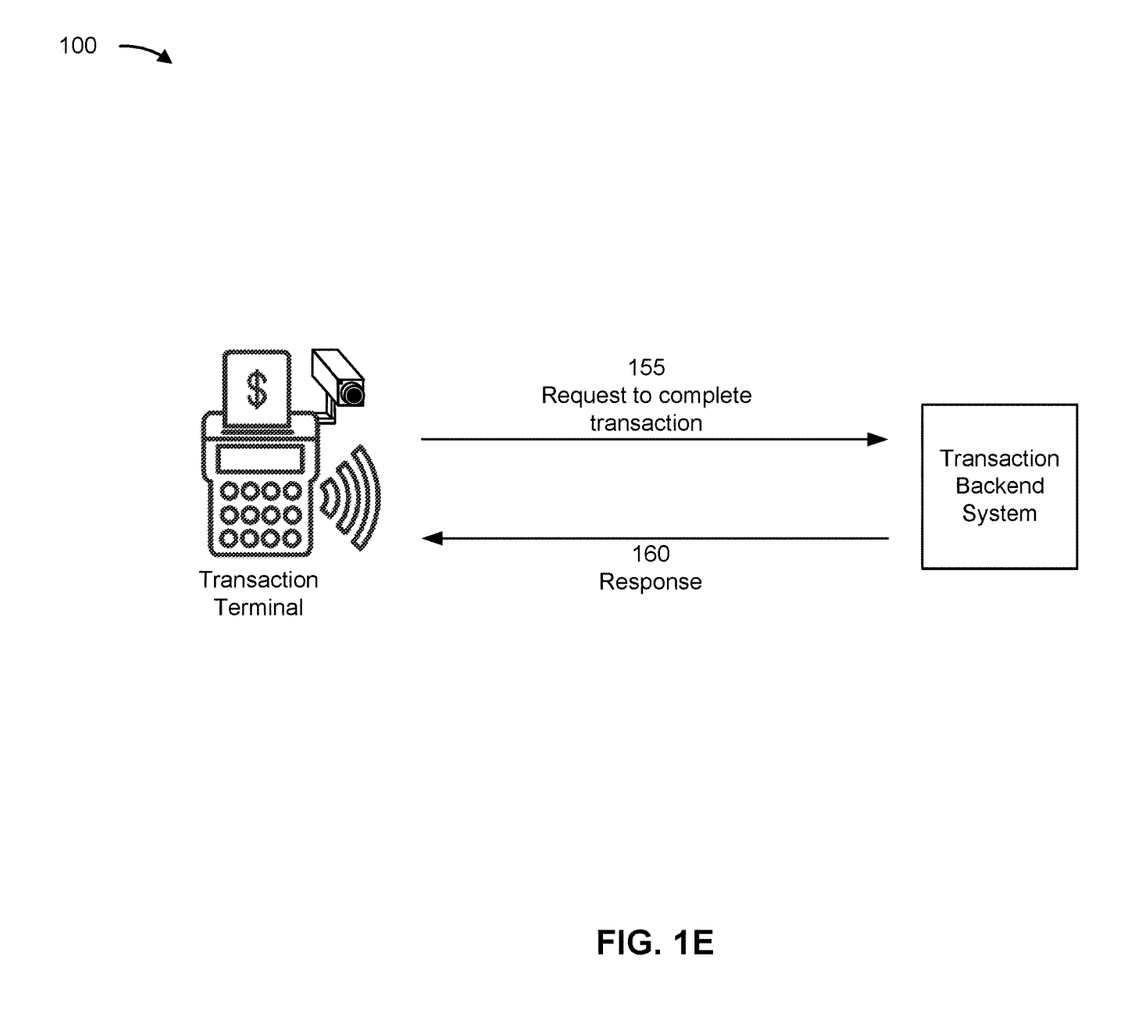

As shown in FIG. 1E and by reference number 155, the transaction terminal may transmit a request to complete the transaction to the transaction backend system. For example, the request may be an authorization request. The request may identify the credential, and the transaction backend system may process the credential to complete the transaction.

As shown by reference number 160, the transaction backend system may transmit to the transaction terminal a response indicating that the transaction is complete. Based on receiving the response, the transaction terminal may display an indication that the transaction is complete, may transmit a receipt for the transaction to the mobile device (e.g., via the connection), and/or may terminate the connection with the mobile device, among other examples. In addition, the transaction terminal may transmit to the mobile device, via the connection, an indication that the transaction is complete, which may cause the mobile device to terminate the connection with the transaction terminal. After completion of the transaction, the mobile device may be moved outside of the threshold distance of the transaction terminal, thereby breaking the connection with the transaction terminal (if not already terminated). The transaction terminal and/or the mobile device may delete stored information associated with the transaction (e.g., the first facial biometric information and/or the second facial biometric information) based on the termination of the connection. Moreover, the transaction terminal may resume broadcasting the signal (e.g., for connecting with a next user that is to perform a transaction).

In this way, the user may perform the transaction at the transaction terminal with limited interaction with the transaction terminal and without physically touching the transaction terminal. Moreover, the authentication of the user by a facial biometric may reduce or eliminate the possibility of a fraudulent transaction using the mobile device. Furthermore, obtaining the second facial biometric information at the transaction terminal, which is associated with a camera that is already in a position to capture an image or perform a depth scan, eliminates processing delays associated with the user removing the mobile device from a purse or pocket and manually aligning the camera (potentially multiple times due to user error) to obtain biometric information.

As indicated above, FIGS. 1A-1E are provided as an example. Other examples may differ from what is described with regard to FIGS. 1A-1E.

Figure 2:
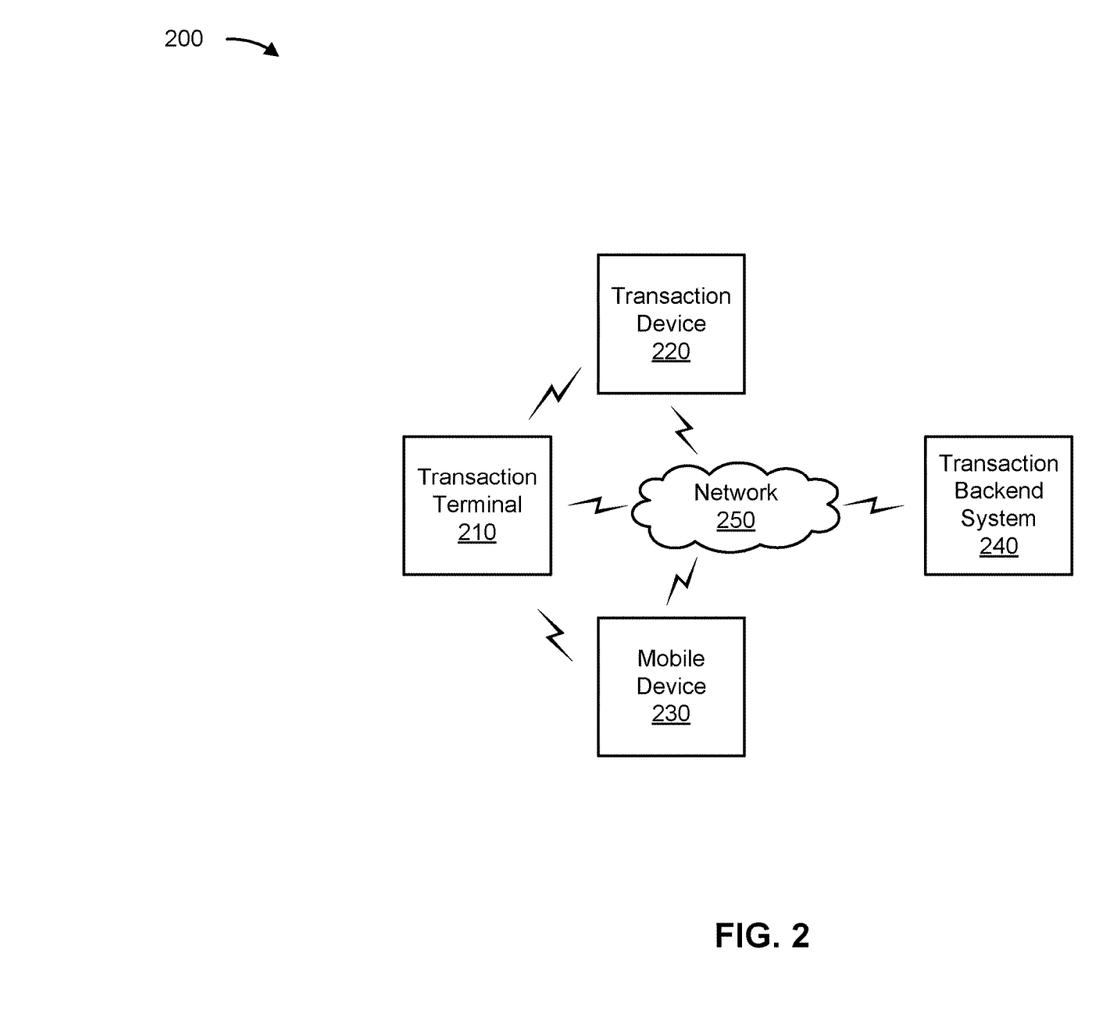
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a transaction terminal 210, a transaction device 220, a mobile device 230, a transaction backend system 240, and a network 250. Devices of environment 200 may interconnect via wired connections and/or wireless connections.

The transaction terminal 210 (e.g., a terminal device) includes one or more devices capable of facilitating an electronic transaction associated with the transaction device 220. For example, the transaction terminal 210 may include a POS terminal, a payment terminal (e.g., a credit card terminal, a contactless payment terminal, a mobile credit card reader, or a chip reader), and/or an automated teller machine (ATM). The transaction terminal 210 may include one or more input components and/or one or more output components to facilitate obtaining data (e.g., account information) from the transaction device 220 and/or to facilitate interaction with and/or authorization from an owner or accountholder of the transaction device 220. Example input components of the transaction terminal 210 include a number keypad, a touchscreen, a magnetic stripe reader, a chip reader, and/or a radio frequency (RF) signal reader (e.g., an NFC reader). Example output devices of transaction terminal 210 include a display and/or a speaker.

The transaction device 220 includes one or more devices capable of being used for an electronic transaction. In some implementations, the transaction device 220 includes a transaction card (or another physical medium with integrated circuitry) capable of storing and communicating account information, such as a credit card, a debit card, a gift card, an ATM card, a transit card, a fare card, and/or an access card. In some implementations, the transaction device 220 may be the mobile device 230 or may be integrated into the mobile device 230. For example, the mobile device 230 may execute an electronic payment application capable of performing functions of the transaction device 220 described herein. Thus, one or more operations described herein as being performed by the transaction device 220 may be performed by a transaction card, the mobile device 230, or a combination thereof.

The transaction device 220 may store account information associated with the transaction device 220, which may be used in connection with an electronic transaction facilitated by the transaction terminal 210. The account information may include, for example, an account identifier that identifies an account (e.g., a bank account or a credit account) associated with the transaction device 220 (e.g., an account number, a card number, a bank routing number, and/or a bank identifier), a cardholder identifier (e.g., identifying a name of a person, business, or entity associated with the account or the transaction device 220), expiration information (e.g., identifying an expiration month and/or an expiration year associated with the transaction device 220), and/or a credential (e.g., a payment token). In some implementations, the transaction device 220 may store the account information in tamper-resistant memory of the transaction device 220, such as in a secure element. As part of performing an electronic transaction, the transaction device 220 may transmit the account information to the transaction terminal 210 using a communication component, such as a magnetic stripe, an integrated circuit (IC) chip (e.g., a EUROPAY®, MASTERCARD®, VISA® (EMV) chip), and/or a contactless communication component (e.g., an NFC component, an RF component, a Bluetooth component, and/or a BLE component). Thus, the transaction device 220 and the transaction terminal 210 may communicate with one another by coming into contact with one another (e.g., using a magnetic stripe or an EMV chip) or via contactless communication (e.g., using NFC or BLE).

The mobile device 230 includes one or more devices capable of being used for an electronic transaction, as described above in connection with the transaction device 220. The mobile device 230 may include a communication device and/or a computing device. For example, the mobile device 230 may include a wireless communication device, a mobile phone, a user equipment, a tablet computer, a wearable communication device (e.g., a smart wristwatch, a pair of smart eyeglasses, a head mounted display, or a virtual reality headset), or a similar type of device. Additionally, or alternatively, the mobile device 230 may be capable of receiving, generating, storing, processing, and/or providing information associated with authentication by a facial biometric, as described elsewhere herein.

The transaction backend system 240 includes one or more devices capable of processing, authorizing, and/or facilitating a transaction. For example, the transaction backend system 240 may include one or more servers and/or computing hardware (e.g., in a cloud computing environment or separate from a cloud computing environment) configured to receive and/or store information associated with processing an electronic transaction. The transaction backend system 240 may process a transaction, such as to approve (e.g., permit, authorize, or the like) or decline (e.g., reject, deny, or the like) the transaction and/or to complete the transaction if the transaction is approved. The transaction backend system 240 may process the transaction based on information received from the transaction terminal 210, such as transaction data (e.g., information that identifies a transaction amount, a merchant, a time of a transaction, a location of the transaction, or the like), account information communicated to the transaction terminal 210 by the transaction device 220, and/or information stored by the transaction backend system 240 (e.g., for fraud detection).

The transaction backend system 240 may be associated with a financial institution (e.g., a bank, a lender, a credit card company, or a credit union) and/or may be associated with a transaction card association that authorizes a transaction and/or facilitates a transfer of funds. For example, the transaction backend system 240 may be associated with an issuing bank associated with the transaction device 220, an acquiring bank (or merchant bank) associated with the merchant and/or the transaction terminal 210, and/or a transaction card association (e.g., VISA® or MASTERCARD®) associated with the transaction device 220. Based on receiving information associated with the transaction device 220 from the transaction terminal 210, one or more devices of the transaction backend system 240 may communicate to authorize a transaction and/or to transfer funds from an account associated with the transaction device 220 to an account of an entity (e.g., a merchant) associated with the transaction terminal 210.

The network 250 includes one or more wired and/or wireless networks. For example, the network 250 may include a cellular network, a public land mobile network, a local area network, a wide area network, a metropolitan area network, a telephone network, a private network, the Internet, and/or a combination of these or other types of networks. The network 250 enables communication among the devices of environment 200. In some implementations, the transaction terminal 210 may communicate with the transaction device 220 using a first network (e.g., a contactless network or by coming into contact with the transaction device 220) and may communicate with the transaction backend system 240 using a second network.

The quantity and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
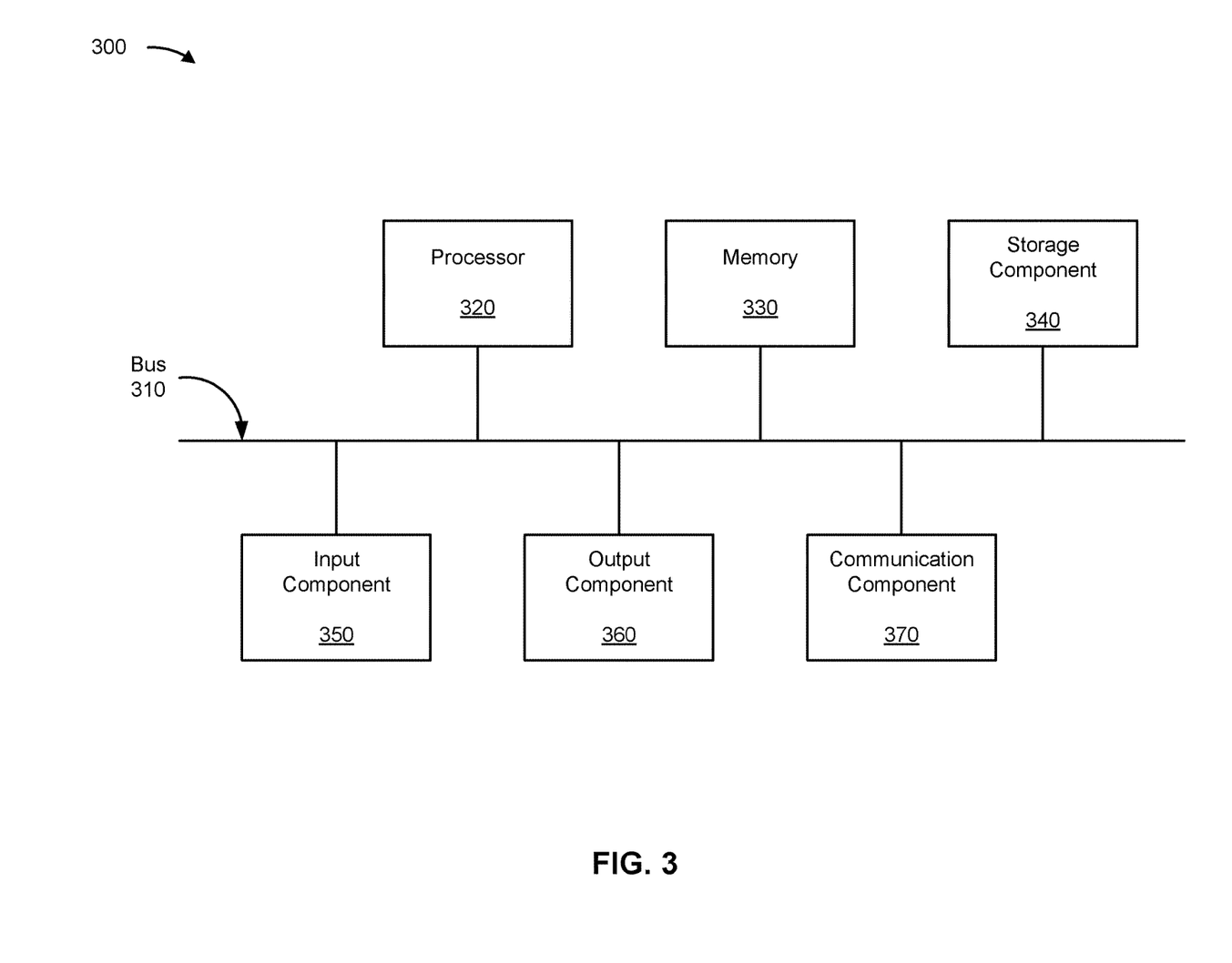
FIG. 3 is a diagram of example components of one or more devices of FIG. 2.

FIG. 3 is a diagram of example components of a device 300, which may correspond to transaction terminal 210, transaction device 220, mobile device 230, and/or a device of transaction backend system 240. In some implementations, transaction terminal 210, transaction device 220, mobile device 230, and/or a device of transaction backend system 240 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
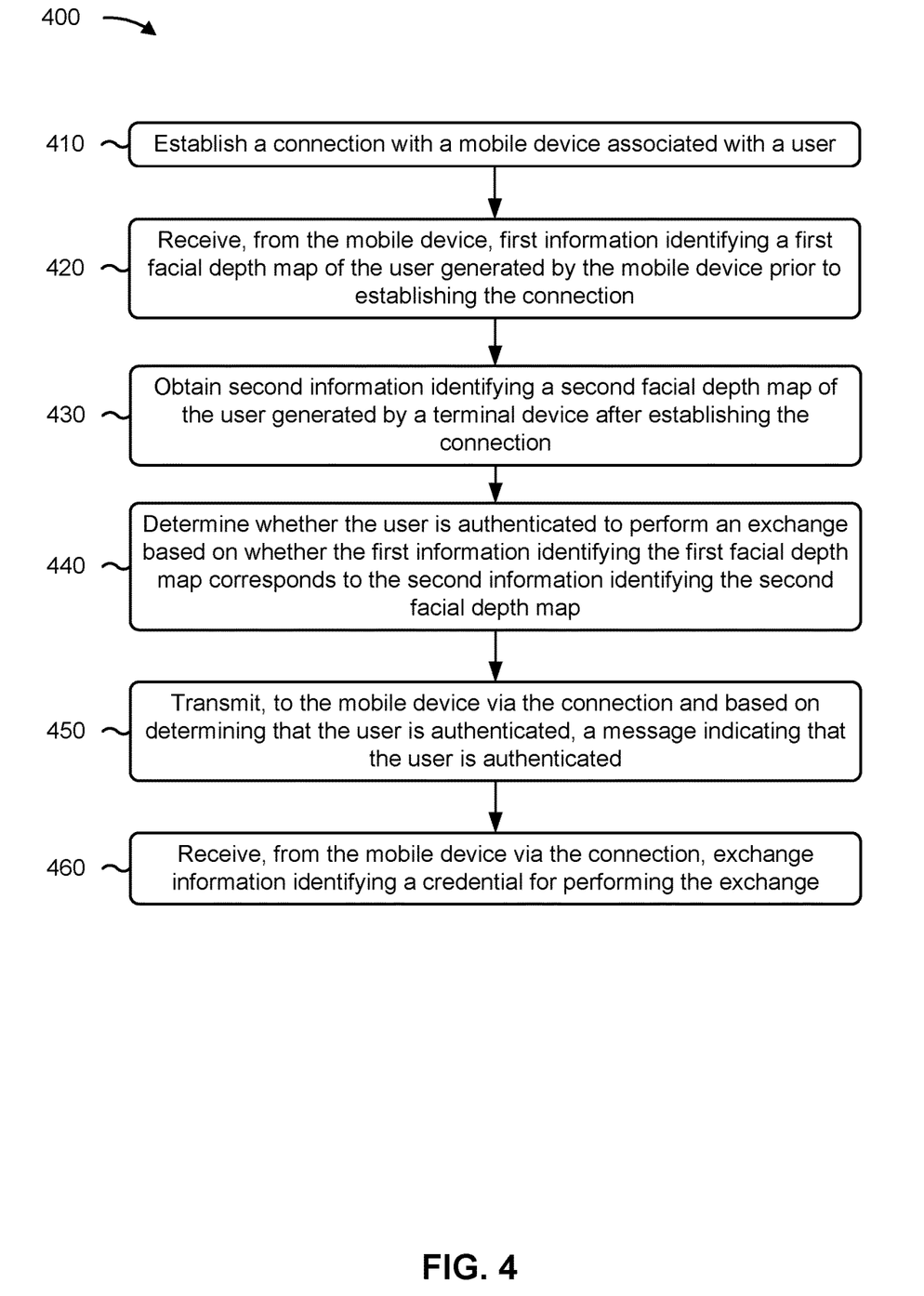
FIG. 4 is a flowchart of an example process relating to authentication by a facial biometric.

FIG. 4 is a flowchart of an example process 400 associated with authentication by a facial biometric. In some implementations, one or more process blocks of FIG. 4 may be performed by a terminal device (e.g., transaction terminal 210). In some implementations, one or more process blocks of FIG. 4 may be performed by another device or a group of devices separate from or including the terminal device, such as a transaction device (e.g., transaction device 220), a mobile device (e.g., mobile device 230), and/or a device of a transaction backed system (e.g., transaction backend system 240). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include establishing a connection with a mobile device associated with a user (block 410). As further shown in FIG. 4, process 400 may include receiving, from the mobile device, first information identifying a first facial depth map of the user generated by the mobile device prior to establishing the connection (block 420). As further shown in FIG. 4, process 400 may include obtaining second information identifying a second facial depth map of the user generated by a terminal device after establishing the connection (block 430). As further shown in FIG. 4, process 400 may include determining whether the user is authenticated to perform an exchange based on whether the first information identifying the first facial depth map corresponds to the second information identifying the second facial depth map (block 440). As further shown in FIG. 4, process 400 may include transmitting, to the mobile device via the connection and based on determining that the user is authenticated, a message indicating that the user is authenticated (block 450). As further shown in FIG. 4, process 400 may include receiving, from the mobile device via the connection, exchange information identifying a credential for performing the exchange (block 460).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for authentication of a user, the system comprising:
   one or more memories; and one or more processors, communicatively coupled to the one or more memories, configured to:
  establish a connection with a mobile device associated with the user;
  receive, from the mobile device, first information identifying:
    a first facial depth map of the user generated by the mobile device prior to establishing the connection, and
    a time when the first facial depth map was generated;
  obtain second information identifying a second facial depth map of the user generated by the system after establishing the connection;
  determine whether the time is before a subsequent time, when the second facial depth map was generated, by a threshold amount;
  determine that the user is authenticated to perform an exchange based on the first information identifying the first facial depth map corresponding to the second information identifying the second facial depth map and based on determining that the time is before the subsequent time by the threshold amount;
  transmit, to the mobile device via the connection and based on determining that the user is authenticated, a message indicating that the user is authenticated; and
  receive, from the mobile device via the connection, exchange information identifying a credential for performing the exchange.

2. The system of claim 1, further comprising an infrared camera used to obtain the second information identifying the second facial depth map.

3. The system of claim 1, wherein the one or more processors, when obtaining the second information identifying the second facial depth map, are configured to:
  perform a distance sensing operation in connection with the user; and
  generate the second facial depth map based on the distance sensing operation.

4. The system of claim 3, wherein the distance sensing operation is performed using an infrared camera of the system.

5. The system of claim 1, wherein the one or more processors are further configured to:
  determine that the first information identifying the first facial depth map corresponds to the second information identifying the second facial depth map.

6. The system of claim 5, wherein the first information identifying the first facial depth map is determined to correspond to the second information identifying the second facial depth map based on a determination that a degree of similarity between the first information and the second information satisfies a threshold value.

7. A non-transitory computer-readable medium storing a set of instructions for authentication of a user, the set of instructions comprising:
  one or more instructions that, when executed by one or more processors of a terminal device, cause the terminal device to:
    receive, from a mobile device associated with the user, first information identifying:
      a first facial depth map of the user generated by the mobile device, and
      a time when the first facial depth map was generated;
    generate a second facial depth map of the user, wherein the first facial depth map is generated before the second facial depth map;
    determine that the time is before a subsequent time, when the second facial depth map was generated, by a threshold amount;
    determine that the user is authenticated to perform an exchange based on the first information identifying the first facial depth map corresponding to second information identifying the second facial depth map and based on determining that the time is before the subsequent time by the threshold amount;
    transmit, to the mobile device and based on determining that the user is authenticated, a message indicating that the user is authenticated; and
    receive, from the mobile device, exchange information identifying a credential for performing the exchange.

8. The non-transitory computer-readable medium of claim 7, wherein the one or more instructions, that cause the terminal device to generate the second facial depth map, cause the terminal device to:
  perform a distance sensing operation in connection with the user; and
  generate the second facial depth map based on the distance sensing operation.

9. The non-transitory computer-readable medium of claim 7, wherein the one or more instructions further cause the terminal device to:
  transmit, to a backend system and based on receiving the exchange information, a request for completion of the exchange,
  wherein the request identifies the credential.

10. The non-transitory computer-readable medium of claim 7, wherein the one or more instructions further cause the terminal device to:
  broadcast a signal that identifies the terminal device;
  receive a connection request from the mobile device; and
  establish a connection with the mobile device based on receiving the connection request.

11. The non-transitory computer-readable medium of claim 7, wherein the first facial depth map is generated prior to a procedure for performing the exchange, and
  wherein the second facial depth map is generated as part of the procedure for performing the exchange.

12. A method for authenticating a user, comprising:
  establishing, by a terminal device, a connection with a mobile device associated with the user;
  obtaining, by the terminal device, first facial biometric information of the user generated at a time by the mobile device prior to establishing the connection;
  obtaining, by the terminal device, second facial biometric information of the user generated at a subsequent time by the terminal device after establishing the connection;
  determining, by the terminal device, that the time is before the subsequent time by a threshold amount;
  determining, by the terminal device, that the user is authenticated to perform an exchange based on the first facial biometric information corresponding to the second facial biometric information and based on determining that the time is before the subsequent time by the threshold amount;
  transmitting, by the terminal device to the mobile device via the connection and based on determining that the user is authenticated, a message indicating that the user is authenticated; and
  receiving, by the terminal device from the mobile device via the connection, exchange information identifying a credential for performing the exchange.

13. The method of claim 12, wherein the first facial biometric information is obtained from the mobile device or from a backend system.

14. The method of claim 12, wherein obtaining the second facial biometric information comprises:
- performing a distance sensing operation in connection with the user; and
- generating the second facial biometric information based on the distance sensing operation.

15. The method of claim 14, wherein the distance sensing operation is performed using an infrared camera of the terminal device.

16. The method of claim 12, wherein establishing the connection with the mobile device comprises:
- broadcasting a signal that identifies the terminal device; and
- receiving a connection request from the mobile device.

17. The method of claim 12, wherein the connection is a Bluetooth low energy connection.

18. The method of claim 12, wherein the message causes the mobile device to prompt the user to select the credential for performing the exchange.

\* \* \* \* \*